(12) United States Patent
Chiyomaru

(10) Patent No.: US 10,336,631 B2
(45) Date of Patent: Jul. 2, 2019

(54) WASTEWATER TREATMENT METHOD AND WASTEWATER TREATMENT APPARATUS

(71) Applicant: MITSUBISHI HEAVY INDUSTRIES, LTD., Tokyo (JP)

(72) Inventor: Masaru Chiyomaru, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 111 days.

(21) Appl. No.: 15/026,448

(22) PCT Filed: Oct. 6, 2014

(86) PCT No.: PCT/JP2014/076647
§ 371 (c)(1),
(2) Date: Mar. 31, 2016

(87) PCT Pub. No.: WO2015/056588
PCT Pub. Date: Apr. 23, 2015

(65) Prior Publication Data
US 2016/0251241 A1     Sep. 1, 2016

(30) Foreign Application Priority Data

Oct. 16, 2013  (JP) ................................ 2013-215731

(51) Int. Cl.
*C02F 1/52*     (2006.01)
*B01J 20/02*    (2006.01)
(Continued)

(52) U.S. Cl.
CPC ......... *C02F 1/5236* (2013.01); *B01J 20/0233* (2013.01); *B01J 20/0288* (2013.01);
(Continued)

(58) Field of Classification Search
CPC .................................................. C02F 1/5236
See application file for complete search history.

(56) References Cited

U.S. PATENT DOCUMENTS 4,790,945 A   12/1988  Baker
4,806,264 A    2/1989  Murphy
(Continued)

FOREIGN PATENT DOCUMENTS

CN    102791638 A    11/2012
EP    2 559 667 A1    2/2013
(Continued)

OTHER PUBLICATIONS

Office Action dated Sep. 27, 2016, issued in counterpart Australian Patent Application No. 2014335409. (4 pages).
(Continued)

*Primary Examiner* — Peter Keyworth
(74) *Attorney, Agent, or Firm* — Westerman, Hattori, Daniels & Adrian, LLP

(57) ABSTRACT

A wastewater treatment method and a wastewater treatment apparatus securely and readily remove selenium, which is considered harmful, by removing not only 0-valent selenium, 4-valent selenium, and 6-valent selenium, but also -2-valent selenium. In the wastewater treatment method and the wastewater treatment apparatus for treating wastewater including selenium, -2-valent selenium included in the wastewater is oxidated by using an oxidant, or -2-valent selenium included in the water is removed by using a remover.

2 Claims, 2 Drawing Sheets

(51) Int. Cl.

| | |
|---|---|
| *C02F 1/28* | (2006.01) |
| *C02F 9/00* | (2006.01) |
| *C02F 1/70* | (2006.01) |
| *C02F 1/72* | (2006.01) |
| *C02F 101/10* | (2006.01) |
| *C02F 103/18* | (2006.01) |
| *C02F 1/74* | (2006.01) |
| *C02F 1/00* | (2006.01) |
| *C02F 103/10* | (2006.01) |
| *C02F 103/12* | (2006.01) |
| *C02F 103/16* | (2006.01) |

(52) U.S. Cl.
CPC ............ *C02F 1/281* (2013.01); *C02F 1/5281* (2013.01); *C02F 9/00* (2013.01); *C02F 1/5245* (2013.01); *C02F 1/70* (2013.01); *C02F 1/722* (2013.01); *C02F 1/74* (2013.01); *C02F 2001/007* (2013.01); *C02F 2101/106* (2013.01); *C02F 2103/10* (2013.01); *C02F 2103/12* (2013.01); *C02F 2103/16* (2013.01); *C02F 2103/18* (2013.01); *C02F 2209/02* (2013.01); *C02F 2209/06* (2013.01); *C02F 2209/42* (2013.01)

(56) References Cited

U.S. PATENT DOCUMENTS

| | | | |
|---|---|---|---|
| 5,601,721 A | 2/1997 | Lukasiewicz et al. | |
| 5,993,667 A | 11/1999 | Overman | |
| 6,033,572 A | 3/2000 | Yana et al. | |
| 6,156,191 A | 12/2000 | Overman | |
| 6,214,238 B1 | 4/2001 | Gallup | |
| 6,235,204 B1 | 5/2001 | Castaldi et al. | |
| 2008/0142450 A1 | 6/2008 | Lord et al. | |
| 2009/0204419 A1* | 8/2009 | Stewart | B01D 61/025 705/1.1 |
| 2011/0094972 A1* | 4/2011 | King | A01N 59/16 210/754 |
| 2011/0204000 A1 | 8/2011 | Reed et al. | |
| 2011/0220583 A1 | 9/2011 | Schwarz et al. | |
| 2012/0024798 A1 | 2/2012 | Pickett et al. | |

FOREIGN PATENT DOCUMENTS

| | | |
|---|---|---|
| JP | 48-30557 B1 | 9/1973 |
| JP | 48-30558 B1 | 9/1973 |
| JP | 10-36925 A | 2/1998 |
| JP | 10-99874 A | 4/1998 |
| JP | 11-300372 A | 11/1999 |
| JP | 2001-520119 A | 10/2001 |
| JP | 2005-291967 A | 10/2005 |
| JP | 2005-291968 A | 10/2005 |
| JP | 2006-136843 A | 6/2006 |
| JP | 2008-76253 A | 4/2008 |
| JP | 2008-188536 A | 8/2008 |
| JP | 2013-522008 A | 6/2013 |
| JP | 5591417 B1 | 9/2014 |

OTHER PUBLICATIONS

Notification of Transmittal of Translation of the International Preliminary Report on Patentability (Form PCT/IB/338) dated Apr. 28, 2016, of International Patent Application No. PCT/JP2014/076647, with Forms PCT/IB/373 and PCT/ISA/237. (12 pages).
Concise Explanation of Relevant for Non-English Language Information, for JP S48-30557B and JP S48-30558B (previously cited with information Disclosure Statement filed Mar. 31, 2016).
Office Action dated Jan. 25, 2017, issued in counterpart Chinese Application No. 201480053736.3, with English translation (11 pages).
Office Action dated Mar. 15, 2017, issued in counterpart Australian Application No. 2014335409 (6 pages).
Office Action dated Oct. 10, 2017, issued in counterpart Korean Application No. 10-2016-7007629, with English machine translation. (12 pages).
Office Action dated Jul. 5, 2017, issued in counterpart Australian Patent Application No. 2014335409. (11 pages).
International Search Report dated Jan. 13, 2015, issued in counterpart International Application No. PCT/JP2014/076647 (4 pages).

* cited by examiner

WASTEWATER TREATMENT METHOD AND WASTEWATER TREATMENT APPARATUS

FIELD OF THE INVENTION

The present invention relates to a wastewater treatment method and to a wastewater treatment apparatus, and more specifically, relates to a wastewater treatment method and to a wastewater treatment apparatus for treating water containing selenium.

BACKGROUND ART

Selenium contained in wastewater drained from a desulfurization apparatus of a coal gasification combined power generation facility (integrated coal gasification combined cycle (IGCC)) or a desulfurization apparatus for treatment of flue gas from a boiler, is a hazardous substance under the Water Pollution Prevention Act of Japan, and it is strongly desired to remove it in a wastewater treatment process. It has been known that for a method of removing selenium like this, methods such as an iron coprecipitation method, an ion exchange resin adsorption method, a microbial treatment method, and the like may be used depending on the valence of the selenium (see Patent Literatures 1 to 3, for example). 0-valent selenium (e.g., selenium metal) and 4-valent selenium (e.g. selenite ions) are adsorbed and separated by an iron coprecipitation method or an ion exchange resin adsorption method. It is difficult to remove 6-valent selenium (e.g., selenate ions) by an ion exchange resin adsorption method or an iron coprecipitation method. Accordingly, 6-valent selenium is subjected to iron coprecipitation after reducing to 4-valent selenium.

However, wastewater treated in a coal gasification combined power generation process or a treatment f flue gas from a boiler in a reducing atmosphere includes selenium organic compounds and selenium in a plurality of forms. The effects of conventional removal methods cannot be obtained in treating such wastewater. For example, wastewater drained from coal gasification compound power generation facilities contain -2-valent selenium e.g., selenocyanate ions). It is difficult to remove such -2-valent selenium by conventional removal methods.

CITATION LIST

Patent Literature

[Patent Literature 1] JP 2005-291967 A
[Patent Literature 2] JP 2005-291968 A
[Patent Literature 3] JP 2006-136843 A

SUMMARY OF INVENTION

Technical Problem

Under these circumstances, an object of the present invention is to provide a wastewater treatment method and a wastewater treatment apparatus that securely and readily remove selenium from wastewater by removing not only 0-valent selenium, and 4-valent selenium but also -2-valent selenium contained in the wastewater.

Solution to Problem

In order to achieve the object, a wastewater treatment apparatus according to the present invention is a wastewater treatment apparatus for treating wastewater including selenium, in which -2-valent selenium included in the wastewater is oxidated by using an oxidant or -2-valent selenium included in the wastewater is removed by using a remover.

It is preferable to use an aqueous solution of hydrogen peroxide.

It is preferable to use any one of silver chloride, copper chloride, and copper sulfate as the remover.

The silver chloride may be generated by reacting hydrochloric acid with silver nitrate.

It is preferable that the selenium obtained by oxidating -2-valent selenium with an aqueous solution of hydrogen peroxide be separated in a subsequent coprecipitation step by coprecipitation with 0-valent selenium and/or 4-valent selenium existing originally in the wastewater by using iron hydroxide.

In this aspect, the -2-valent selenium is removed by using a treatment method for removing and separating 0-valent selenium and/or 4-valent selenium without requiring a treatment facility for removing and separating -2-valent selenium to be separately provided. Accordingly, all selenium included in wastewater in various different forms can be removed without increasing the costs for the wastewater treatment facility.

A coprecipitation treatment step may be performed, which is a step of separating 0-valent selenium and/or 4-valent selenium from the wastewater by coprecipitation with iron hydroxide after the silver chloride has adsorbed the -2-valent selenium for separation.

In this aspect, the -2-valent selenium is separated by filtration after being adsorbed into silver chloride and 0-valent selenium and/or 4-valent selenium are removed by coprecipitation with iron hydroxide.

In another aspect of the present invention, a wastewater treatment apparatus configured to remove selenium included in wastewater drained from a coal gasification compound power generation facility includes receiving tank into which the wastewater including -2-valent selenium, 0-valent selenium, 4-valent selenium, and 6-valent selenium flows; an oxidation tank configured to oxidate the -2-valent selenium by using an aqueous solution of hydrogen peroxide or a removal tank configured to adsorb the -2-valent selenium and allow the -2-valence selenium receiving tank 2 to precipitate by using silver chloride generated by a reaction between silver nitrate and hydrochloric acid; a reduction tank configured to reduce the 6-valent selenium into 0-valent selenium and/or 4-valent selenium by using a reductant and a precipitation tank configured to allow the 0-valent selenium and the 4-valent selenium in the water that has flowed in from the reaction tank to precipitate and separate by iron coprecipitation.

The wastewater treatment apparatus described above is capable of securely and readily removing -2-valent selenium included in wastewater generated in facilities such as coal gasification compound power generation facilities. 6-valent selenium is first reduced into 0-valent selenium or 4-valent selenium and then removed by using a treatment method for removing selenium in other forms. Accordingly, selenium of different forms included in the wastewater can be securely and readily removed.

It is preferable that the oxidation tank or the removal tank be an aeration tank configured to remove volatile substances in the wastewater that has flowed in from the receiving tank.

Advantageous Effects of Invention

According to the present invention, a wastewater treatment method and apparatus for treating selenium capable of securely and readily removing selenium from wastewater by removing not only 0-valent selenium, 4-valent selenium, and 6-valent selenium included in the wastewater, but also -2-valet selenium included in the wastewater, which is selenium in a different form.

DESCRIPTION OF EMBODIMENTS

A first embodiment of a wastewater treatment apparatus according to the present invention will be described in detail below with reference to attached drawings.

Wastewater used in the present embodiment is typically wastewater including selenium generated in a coal gasification compound power generation process or boiler exhaust gas process. Although a certain quantity of particulate selenium or gaseous selenium generated by the above-described treatment can be collected by a collection apparatus (a dust collector and a desulfurization apparatus), selenium that has not been collected thereby may be transferred into wastewater. Selenium is distinguished into selenium with the valence of -2 (hereinafter referred to as "-2-valent selenium"), selenium with the valence of 0 (hereinafter referred to as "0-valent selenium"), selenium with the valence of 4 (hereinafter referred to as "4-valent selenium"), and selenium with the valence of 6 (hereinafter referred to as "6-valent selenium") according to the oxidation number. More specifically, selenium contained in wastewater includes -2-valent selenium (primary form: selenocyanate ions, $SeCN^-$), 0-valent selenium (metal selenium), 4-valent selenium (primary form: selenite ions, $SeO_3^{2-}$), and 6-valent selenium (primary form: selenate $SeO_4^{2-}$).

Figure 1:
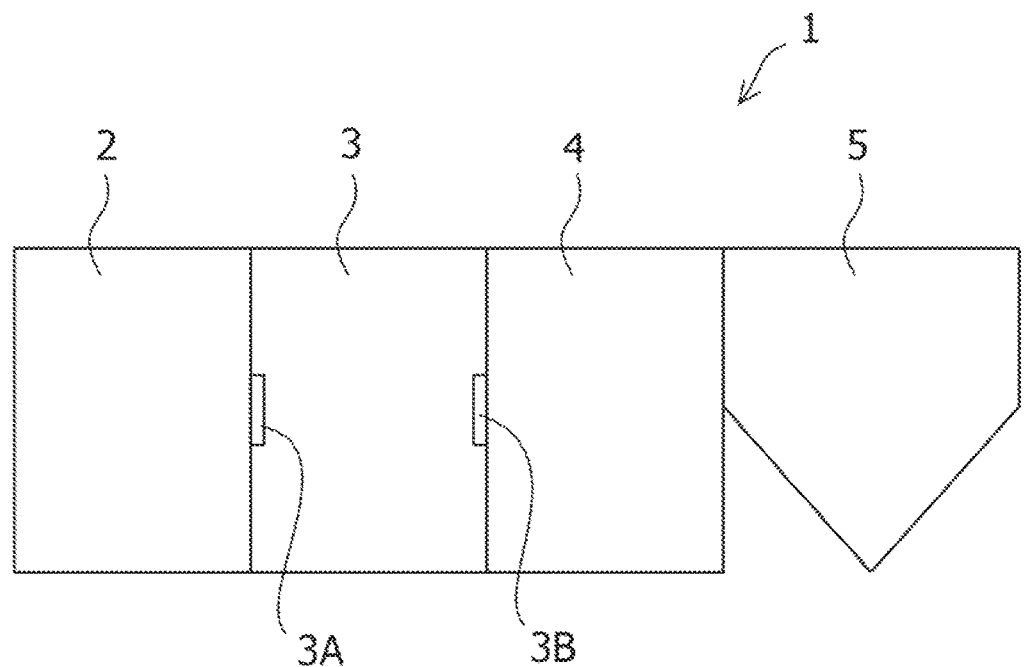
FIG. 1 is a schematic cross section of an embodiment of a wastewater treatment apparatus according to the present invention.

FIG. 1 is a schematic cross section which illustrates an embodiment of a wastewater treatment apparatus 1 according to the present invention. Referring to FIG. 1, the wastewater treatment apparatus 1 includes a receiving tank 2, an aeration tank 3, a reaction tank 4, and a precipitation tank 5. In order to control reactions, each tank can include, where necessary, a stirring unit, a heater, a cooler, temperature sensors, concentration sensors, pH sensors, level sensors, a circulating pump, a filter, and the like.

The receiving tank 2 is a tank for receiving the wastewater containing selenium, which is configured so that the wastewater flows in.

The aeration tank 3 is a tank for aerating the wastewater, which is configured to perform an aeration treatment to the wastewater that has flowed in. In the aeration tank 3, an aperture, a diffuser tube, an aerator, and the like can be arranged to perform the aeration treatment.

An inflow port 3A through which the wastewater from the receiving tank 2 flows in is arranged in a part of the aeration tank 3 on the side of the receiving tank 2. An outflow port 3B through which the wastewater is discharged into the reaction tank 4 is arranged in a part of the aeration tank 3 on the side of the reaction tank 4. Portions of the inside of the aeration tank 3 around the inflow port 3A and the outflow port 3B are configured so as to oxidate -2-valent selenium into 0-valent selenium and/or 4-valent selenium that can be separated by coprecipitation separation in the following reaction tank 4 and/or the precipitation tank 5. In other words, in the present embodiment, the aeration tank 3 also functions as an oxidation tank. On the other hand, in a primary portion of the aeration tank 3, volatile substances in the wastewater are removed.

The reaction tank 4 and the precipitation tank 5 are tanks for separating selenium from the wastewater by coprecipitation separation, and are configured to separate 0-valent selenium and 4-valent selenium from the wastewater by coprecipitation separation by adding coprecipitation agent in the reaction tank 4 and/or the precipitation tank 5.

A first embodiment of a wastewater treatment method that uses the wastewater treatment apparatus according to the first embodiment having the above-described apparatus configuration will be described in more detail below.

Wastewater containing selenium flows into the receiving tank 2. As described above, the wastewater which has flowed in contains a plurality of chemically different forms of selenium.

The wastewater which has passed the receiving tank 2 flows in to the aeration tank 3. Air is supplied to the aeration tank 3, and an aeration treatment is performed by using the supplied air. The aeration treatment may be performed by exposing the wastewater to outside an by jetting or bubbling the wastewater, or alternatively, by supplying compressed air via the diffuser tube, the aerator, and the like. In this manner, the volatile substances can be removed from the wastewater.

In the portion around the inflow port 3A and/or the outflow port 3B of the aeration tank 3, an aqueous solution of an aqueous solution of hydrogen peroxide for oxidation of -2-valent selenium is added. Thus hydrogen peroxide and the selenocyanic acid compound including -2-valent selenium in the wastewater react and -2-valent selenium is oxidated into 0-valent and/or 4-valent selenium. In the above-described manner, in the aeration tank 3, volatile substances can be removed from the wastewater and -2-valent selenium can be oxidized into 0-valent selenium and/or 4-valent selenium that can be separated by the following coprecipitation separation treatment. The reaction atmosphere, such as the pH, the temperature, and the concentration, or the reaction time and the reaction conditions can be adjusted by using an additive, a heater, a cooler, and the like.

With this configuration, between the aeration tank 3 and the reaction tank 4 or in the reaction tank 4, 6-valent selenium in the wastewater can be reduced into 0-valent selenium and/or 4-valent selenium that can readily coprecipitate in the following coprecipitation treatment. For a method of the reduction, hydrogen sulfide bubbling. $SO_2$ bubbling, and platinum reduction, for example, can be used. In addition, as a reductant, ferrous compounds such as ferrous chloride and ferrous sulfate can be added, for example. In addition, note that in reducing 6-valent selenium, if the pH of the wastewater is changed due to generated oxygen and the like, the tanks May be corroded and the reduction rate may decrease, and in order to prevent such phenomena, a pH regulator is added where necessary.

Then, in the reaction tank 4 and the precipitation tank 5, a coprecipitation agent is added. By adding a ferric compound, for example, as the coprecipitation agent, 0-valent selenium and/or 4-valent selenium in the wastewater is separated by coprecipitation together with iron hydroxide. For the ferric compound, ferric chloride, ferric chloride hexahydrate, ferric sulfate, and the like can be used. In order to promote coagulation of the precipitates, a coagulation agent may be added. In this treatment, the reaction atmosphere, such as the pH, the temperature, and the concentration, or the reaction time and the reaction conditions can be adjusted by using an additive, a heater, a cooler, and the like. For example, sodium hydroxide, hydrochloric acid, sulfuric acid, and the like can be used as the pH regulator and polyaluminum chloride (PAC), polyaluminum chloride, polymer heavy metal scavenger (e.g., Epofloc) can be used as the additive.

According to the present embodiment, all the selenium of different chemical forms in wastewater can be securely and readily removed by removing -2-valent selenium contained in the wastewater generated from a desulfurization apparatus of a coal gasification combined power generation facility or a desulfurization apparatus for treatment of flue gas from a boiler.

As described above, the -2-valent selenium contained in wastewater can be removed by using a conventional removal method capable of removing the 0-valent selenium and 4-valent selenium after oxidating the -2-valent selenium into 0-valent selenium or 4-valent selenium that can be removed by an ordinary removal method. Further, because the -2-valent selenium is oxidated into selenium of other forms in the aeration treatment performed by the aeration tank 3, it is not necessary to provide a separate treatment facility for oxidation. With the above-described configuration, -2-valent selenium included in wastewater can be more securely and more readily removed without increasing the costs for the wastewater treatment facility.

Further, in the present embodiment, after the 6-valent selenium included in wastewater is oxidated into 0-valent selenium or 4-valent selenium that can be removed by an ordinary removal method, the 0-valent selenium and 4-valent selenium can be removed by a conventional removal method capable of removing the 0-valent selenium and 4-valent selenium. Accordingly, 6-valent selenium included in wastewater can be more securely and more readily removed without increasing the costs for the wastewater treatment facility.

A second embodiment of the wastewater treatment apparatus according to the present invention will be described below. In the present embodiment, because configurations other than the aeration tank 3 are the same as those of the first embodiment, descriptions thereof will not be repeated below.

The aeration tank 3 according to the present embodiment is a tank for aerating wastewater, which is configured to perform an aeration treatment to the wastewater that has flowed in. In the aeration tank 3, an aperture, a diffuser tube, an aerator, and the like can be arranged to perform the aeration treatment. In addition, in the aeration tank 3, a pump, a filter, and the like, which are components for separating silver chloride that has adsorbed -2-valent selenium as will be described below, are installed, although they are not shown in the drawing.

An inflow port 3A through which the wastewater from the receiving tank 2 flows in is arranged in a part of the aeration tank 3 on the side of the receiving tank 2. An outflow port 3B through which the wastewater is discharged into the reaction tank 4 is arranged in a part of the aeration tank 3 on the side of the reaction tank 4. Portions around the inflow port 3A and/or the outflow port 3B according to the present embodiment are configured so as to filter off and separate silver chloride that has been directly added or generated in the wastewater by allowing the silver chloride to adsorb -2-valent selenium. In other words, in the present embodiment, the aeration tank 3 also functions as a removal tank.

On the other hand, in a primary portion of the aeration tank 3, volatile substances in the wastewater are removed.

A second embodiment of the wastewater treatment method that uses the wastewater treatment apparatus according to the first embodiment will be described in more detail below.

Referring to FIG. 1, wastewater containing the selenium first flows into the receiving tank 2 and then into the aeration tank 3. Air is supplied to the aeration tank 3, and an aeration treatment is performed to the wastewater by using the supplied air. The aeration treatment may be performed by exposing the wastewater to outside air by jetting or bubbling the wastewater, or alternatively, by supplying compressed air via the diffuser tube, the aerator, and the like. In this manner, the volatile substances can be removed from the wastewater.

In the portion around the inflow port 3A and/or the outflow port 3B of the aeration tank 3, silver chloride for adsorbing and separating -2-valent selenium is added. Thus -2-valent selenium in the wastewater is adsorbed to the added silver chloride. More specifically, because silver ions and selenocyanate ions, which are -2-valent selenium, have a high affinity, the selenocyanate ions are adsorbed onto the surface of the silver chloride particles. By filtering off and separating silver chloride that has adsorbed selenocyanate ions, volatile substances can be removed from the wastewater and thereby -2-valent selenium can be removed in the aeration tank 3. In an alternative configuration, copper chloride or copper sulfate can be used instead of the silver chloride described above. A commercial product may be used as the silver chloride, and alternatively, the silver chloride may be prepared by a reaction between an aqueous solution of silver nitrate and hydrochloric acid. The reaction conditions, such as the pH, the temperate and the concentration, or the reaction time and the reaction conditions can be adjusted by using an additive, a heater, a cooler, and the like.

Between the aeration tank 3 and the reaction tank 4 or in the reaction tank 4, a reductant is added. With this configuration, 6-valent selenium in the wastewater can be reduced into 0-valent selenium and/or 4-valent selenium that can readily coprecipitate in the following coprecipitation treatment. For a method of the reduction, hydrogen sulfide bubbling, $SO_2$ bubbling, and platinum reduction, for example, can be used. In addition, as a reductant, ferrous compounds such as ferrous chloride and ferrous sulfate can be added, for example. Note that in reducing selenium, if the pH of the wastewater is changed due to generated oxygen and the like, the tanks may be corroded and the reduction rate may decrease, and in order to prevent such phenomena, a pH regulator is added when necessary.

Then, in the reaction tank 4 and/or the precipitation tank 5, a ferric compound, for example, is added as the coprecipitation agent, 0-valent selenium and/or 4-valent selenium in the wastewater is separated by coprecipitation together with iron hydroxide. For the ferric compound, ferric chloride, ferric chloride hexahydrate, ferric sulfate, and the like can be used. In order to promote coagulation of the precipitate including iron hydroxide as its main component, a coagulation agent may be added. In this treatment, the reaction atmosphere, such as the pH, the temperature, and the concentration, or the reaction time and the reaction conditions can be adjusted by using an additive, a heater, a cooler, and the like. Sodium hydroxide, hydrochloric acid, sulfuric acid, and the like can be used as the pH regulator and polyaluminium chloride (PAC), polyaluminum chloride, polymer heavy metal scavenger (e.g. Epofloc), for example, can be used as the additive.

According to the present embodiment, similarly to the above-described embodiment, all the selenium of different chemical forms in wastewater can be securely and readily removed by removing -2-valent selenium contained in the wastewater generated from a desulfurization apparatus of a coal gasification combined power generation facility or a desulfurization apparatus for treatment of flue gas from a boiler.

In addition, the -2-valent selenium included in the wastewater is removed and separated in the aeration tank 3. With the above-described configuration, -2-valent selenium included in wastewater can be more securely and more readily removed without increasing the costs for the wastewater treatment facility.

In the above-described first embodiment and the second embodiment, pipes are necessarily arranged between and among the receiving tank 2, the aeration tank 3, the reaction tank 4, and the precipitation tank 5, and a reaction tank or a precipitation tank may be arranged for convenience of flowing in and out of wastewater or convenience of performing the treatment. The pipes, the reaction tank, or the precipitation tank may include, where necessary, mechanisms for controlling reaction conditions such as a stirring unit, a heater, a cooler, temperature sensors, concentration sensors, pH sensors, level sensors, a circulating pump, a filter, and the like.

In the above-described first embodiment and the second embodiment, the reduction treatment for reducing 6-valent selenium into 0-valent selenium and/or 4-valent selenium is performed by the reaction tank 4 or between the aeration tank 3 and the reaction tank 4 however, the reduction treatment for reducing 6-valent selenium can be performed at various other timings if all the selenium can be separated by treating the wastewater. For example, 6-valent selenium may be reduced in the receiving tank 2, between the receiving tank 2 and the aeration tank 3, or between the reaction tank 4 and the precipitation tank 5, and further alternatively, the 6-valent selenium may be reduced in the pipe or the separately provided reaction tank or precipitation tank as described above. Furthermore, the portion around either the inflow port 3A or the outflow port 3B of the aeration tank 3 (the oxidation tank) that has not been used for oxidation of the -2-valent selenium may be used as a reduction tank for reducing the 6-valent selenium. The reduction treatment for the 6-valent selenium can be performed at a timing convenient for the process considering the wastewater treatment conditions, the apparatus configuration, and the like.

Further, in the aeration tank 3, a biological reduction treatment can be performed in the aeration tank 3 by activating microorganisms in the wastewater. With this configuration, the 6-valent selenium can also be reduced in the aeration tank 3.

Furthermore, in the above-described first embodiment and the second embodiment, the reduction separation treatment method and the adsorption separation treatment method for 0-valent selenium, 4-valent selenium, and 6-valent selenium are described as an example. However, for these methods, any method capable of separating selenium in the wastewater treatment may be selected. For the reduction separation treatment method and the adsorption separation treatment method for separating selenium, not only the above-described iron coprecipitation method, ion exchange resin adsorption method, and microbial treatment method, but also an ultraviolet reduction method, a hydrazine reduction method, a photocatalysis reduction method, an electrolysis reduction method, a ferrite precipitation method, an adsorption method that uses activated carbon, activated alumina, zeolite, titanic acid, or zirconia hydrate, a membrane separation method, or a method that uses the above-described methods in combination can be used. If the separation treatment method and the removal treatment method described above are used, an additive appropriate for the treatment is used.

Furthermore, in the above-described first embodiment and the second embodiment, the wastewater treatment method and the wastewater treatment apparatus 1 according to the present invention are applied for wastewater wasted from a coal gasification compound power generation treatment; however, the present invention is not limited to this. The wastewater treatment method and the wastewater treatment apparatus according to the present invention can also be necessarily applied, for example, to wastewater produced in the fields of metal production, metal refining, glass production, mining, and the like.

EXAMPLE

The present invention will be more specifically described with reference to Examples; however, the wastewater treatment method and the wastewater treatment apparatus according to the present invention are not limited to the following Examples.

Example 1

(Preparation of Sample)

(1) 300 ml of wastewater including flue gas was prepared, and the wastewater was diluted by 100 times to obtain a solution of Sample 1.

(2) 15.0 ml of hydrogen peroxide was added to 300 ml of the wastewater used in the step (1), the mixture was treated by ion-exchange treatment, and then the treated solution was diluted by 100 times to obtain a solution of Sample 2.

(3) A solution prepared by adding hydrochloric acid to an aqueous solution of silver nitrate was filtered to separate 500 mg, of silver chloride on a filter paper. About 100 ml of the wastewater used in the step (1) was passed through the filter paper to obtain the filtered solution as a solution of Sample 3.

(Measurement)

Samples 1 to 3 were analyzed by using ion chromatography. In the analysis, a detection method using a UV-visible absorbance detector (UV/VIS) with a high sensitivity was selected, and the measurement wavelength ($\lambda$) was 210 nm.

Figures 2A, 2B, 2C:
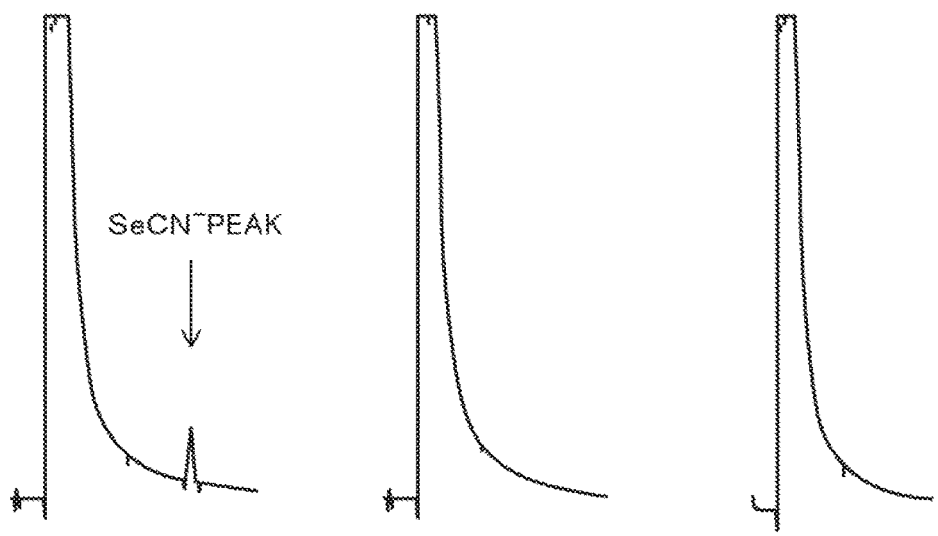
FIGS. 2(a) to 2(c) are graphs that illustrate results of Examples of the embodiment of the present invention.
Figure 3:
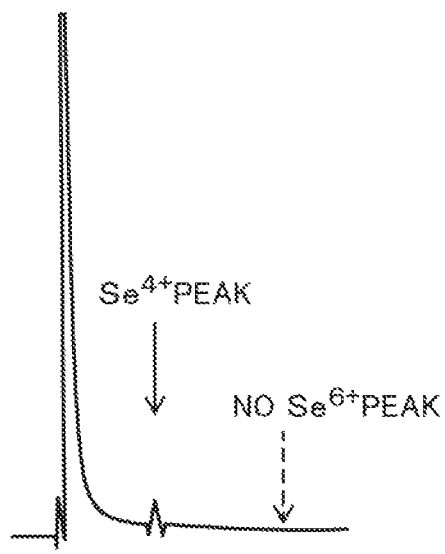
FIG. 3 is a graph which illustrates results of the embodiment of the present invention.

The results of the analyses on Samples 1 to 3 are illustrated in FIGS. 2(*a*) to 2(*c*). In FIGS. 2(*a*) to 2(*c*), the retention time (unit: min) is on the abscissa and the signal intensity (unit: mAU) is on the ordinate.

Referring to FIG. 2(*a*), the peak of the selenocyanic acid ions ($SeCN^-$) with the ion concentration of 0.27 mg/L was observed in Sample 1. Furthermore, referring to FIGS. 2(*b*) and 2(*c*), decrease of $SeCN^-$ peak was observed in Sample 2 treated by $H_2O_2$ treatment and Sample 3 treated by silver chloride treatment. It was found from these results that $SeCN^-$ decreases by $H_2O_2$ treatment and silver chloride treatment.

Example 2

(Measurement)

Sample 2 was analyzed by ion chromatography analysis to analyze the variation of the peaks for selenite ions ($Se^{4+}$)

and selenate ions ($Se^{6+}$). For the detection method, a detection method using the UV-visible absorbance detector (UV/VIS) was selected as in the first embodiment, and the measurement wavelength ($\lambda$) was 210 nm.

A peak for the selenite ions ($Se^{4+}$) was detected in Sample 2, but no peak for $Se^{6+}$ was detected. From these results, it can be considered that selenocyanate ions ($SeCN^-$) in the wastewater existed in Sample 2 in the form of selenate ions ($SeO_3^{2-}$), generated by oxidation treatment by $H_2O_2$ treatment into selenite ions ($Se^{4+}$).

INDUSTRIAL APPLICABILITY

According to the wastewater treatment method and the wastewater treatment apparatus of the present invention, 0-valent selenium, 4-valent selenium, and 6-valent selenium included in wastewater are removed and -2-valent selenium, another form of selenium, is removed, and thereby selenium wastewater is securely and readily removed.

REFERENCE SIGNS LIST

1 Wastewater treatment apparatus
2 Receiving tank
3 Aeration tank
3A Inflow port
3B Outflow port
4 Reaction tank
5 Deposition tank 5

The invention claimed is:

1. A wastewater treatment method of treating wastewater including -2-valent selenium, 0-valent selenium, 4-valent selenium, and 6-valent selenium, the method including the steps:

a removing step of removing -2-valent selenium included in the wastewater by using silver chloride as a remover which is generated by reacting hydrochloric acid with a silver nitrate while the wastewater is supplied with outside air to remove volatile substances from the wastewater, in an aeration tank;

a reducing step of reducing the 6-valent selenium included in the wastewater into at least one of 0-valent selenium and 4-valent selenium by using ferrous chloride as a reductant after the removing step, in a reaction tank; and a coprecipitation treatment step of separating the 0-valent selenium and the 4-valent selenium which remain or are reduced in the wastewater from the wastewater by coprecipitation with iron hydroxide by using ferric chloride as a coprecipitation agent after the reducing step, in a deposition tank.

2. A wastewater treatment method of treating wastewater including -2-valent selenium, 0-valent selenium, 4-valent selenium, and 6-valent selenium, the method including:

a step of oxygenating -2-valent selenium in the wastewater with an aqueous solution of hydrogen peroxide to be at least one of 0-valent selenium and 4-valent selenium while the wastewater is supplied with outside air to remove volatile substances from the wastewater, in an aeration tank;

a reducing step of reducing the 6-valent selenium included in the wastewater into at least one of 0-valent selenium and 4-valent selenium by using ferrous chloride as a reductant after the oxygenating step, in a reaction tank; and a coprecipitation treatment step of separating the 0-valent selenium and the 4-valent selenium which remain or are reduced in the wastewater from the wastewater by coprecipitation with iron hydroxide by using ferric chloride as a coprecipitation agent after the reducing step, in a deposition tank.

* * * * *